May 3, 1960     H. D. SPRAGUE     2,935,042

MILK LINE TENSION APPARATUS

Filed Oct. 9, 1957

INVENTOR
HOWARD D. SPRAGUE

BY *James C. Toomey*
ATTORNEY

United States Patent Office 2,935,042
Patented May 3, 1960

2,935,042

MILK LINE TENSION APPARATUS

Howard D. Sprague, Purcellville, Va.

Application October 9, 1957, Serial No. 689,174

3 Claims. (Cl. 119—14.45)

This invention relates to dairying equipment. More particularly, the invention is concerned with combine milking machines of the type wherein the milk taken from a plurality of animals is fed through a rigid overhead piping system to a single receptacle, and further, wherein a single and common vacuum pump acting through the same overhead system enables simultaneous milking of a plurality of animals.

Generally the necessary vacuum and milk piping system is connected to each animal through a pair of flexible conduits or hoses, one for transporting milk and the other furnishing a suitable vacuum. One end of each of said flexible conduits is connected to the overhead vacuum and milk piping system through suitable disconnect couplings or the like, while the opposite ends thereof are connected to the usual claw including the equally conventional teat cups which are attached to the animal's udders or teats.

Combine milking systems have found greater and greater acceptance among dairy farmers since they eliminate the use of a plurality of individual milking machines and thus one man can readily handle and milk a plurality of animals simultaneously. However, it has been found that in some cases improper milking is effected because of one or more reasons. Among these reasons is the fact that some animals, particularly cows, are so called "hard milkers." In order to milk such animals properly, the udders must be put under a pull or tension. Another difficulty experienced with combine milkers has been due to the fact that often the position of the claw and the manner in which the weight thereof is distributed to the individual teat cups and thus to the animal's teats is such that certain of the udders or teats will "milk out" first, causing a loss of vacuum in the claw which then drops from the animal before complete milking is effected.

The present invention deals with a practical solution to the mentioned problems among others and has been found to be a simple, inexpensive and reliable answer to the difficulties mentioned. While various devices have been proposed as a solution to the mentioned problems encountered in the use of combine milking systems, the present invention produces results equal to or better than such devices and moreover is a considerable improvement thereover in that it is self contained, that is, requires no external anchors, reels, etc., and, when installed, becomes a semi-permanent part of the flexible conduits or hoses leading to the claw, yet may be removed to facilitate replacement, cleaning or the like of these conduits.

Accordingly, an object of the invention is to produce a simple, reliable tensioning device for use with combine a milkers.

Another object of the invention is to produce a device enabling proper positioning of a claw beneath the animal to which the claw is attached.

Still another object of the invention is to produce a device which may be readily attached or removed from the flexible hoses of a combine milker and which enables the introduction of tension in these hoses to insure proper and complete milking of all animals.

A further object of the invention is to produce a claw positioning device which may be readily applied to existing equipment.

A still further object of the invention is to produce a claw positioning and tensioning device which is carried in its entirety on the flexible conduits of a combine or barn type milking apparatus and thus does not clutter up or obstruct the milking area of a barn or the like.

These and other objects of the invention may be accomplished by applying to one of the flexible conduits leading from the overhead piping system of a combine milking installation to each of the individual claws, a pair of conduit gripping members which may be also slid along the length of the conduit and by interposing between these gripping means a spring device which acts to pull the gripping means toward one another. Preferably the gripping members take the form of annular rings which surround the conduit and which are of such diameter that in one position they may be slid along the conduit while in a second position these rings will lock on the conduit and will not move relative thereto.

The manner of effecting the invention will become more apparent when consideration is given to the attached drawing and subsequent detailed description thereof. In the drawing—

Figure 1:
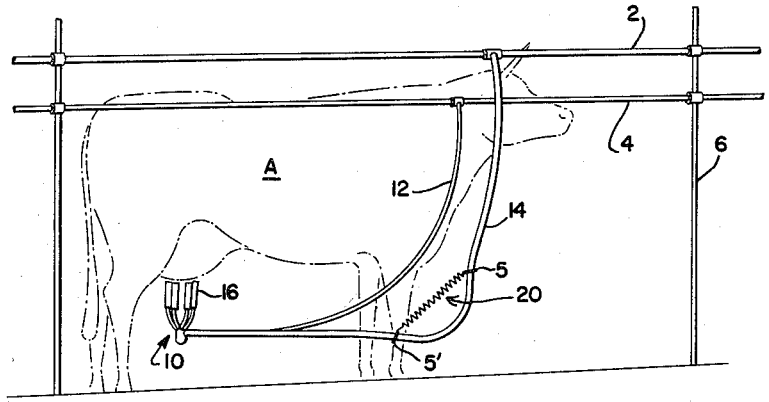
Fig. 1 is a generally schematic view of an individual claw, an overhead vacuum and milk piping system, flexible hoses and the hose tensioning and positioning device comprising the present invention as applied thereto.

Referring now in particular to Fig. 1, it may be seen that, as schematically illustrated, each stall within a barn or other building is provided with a pair of overhead pipes 2 and 4 mounted on suitable vertical supports 6. One of the overhead pipes is larger in diameter than the other. The larger pipe 2 usually comprises a milk return line wherein the milk obtained from an animal is conveyed to a single or common reservoir (not shown). The smaller of the overhead pipes 4 comprises a vacuum line connected to a suitable pump (not shown) whereby proper vacuum may be applied to the usual teat cup claw 10 which is connected to both overhead pipes 2 and 4 through flexible hoses or conduits 12 and 14.

The claw 10 is of substantial size and weight and includes the usual hoses and teat cups 16 which are attached to the udders of the animal A. The teat cups and hence the claw 10 are supposedly held in place during milking solely by the suction developed in the teat cups 16 and because of the weight of the claw it was assumed that sufficient tension would be exerted on the animal's udders whereby each animal regardless of its peculiarities would be properly milked. Such is not the case however since a so called "hard milking" animal will not properly milk. Also, because of the weight of the flexible lines 12 and 14 and the fact that they also depend from the claw 10 on one side thereof, the claw tends to cant or cock in the direction of the weight of the hoses such that it may be seen that unequal strain or pull is developed in the teat cups 16 closest to these hoses. Oftentimes this unequal pull on the udders of the animal will cause those teats or udders under greater tension to "milk out" first with the result that the suction developed in claw 10 and line 12 is broken and the entire claw 10 drops free of the animal regardless of the fact that the animal is only incompletely milked.

Obviously the least that can be said about such occurrences is that they are annoying, but more important is the fact that they reduce the efficiency of combine milkers and increase the amount of individual attention which must be given to the animals. In fact, such occurrences defeat the very purpose of combine milkers in reducing the individual attention necessary to properly milk a multiplicity of animals. By the use of the instant invention however these occurrences are reduced to a minimum and each of the animals may be properly and completely milked with a minimum of attention.

As shown in Fig. 1, one of the flexible hoses or conduits, preferably milk line 14 because of its sturdy construction, is provided with spring device 20 which forms the present invention.

Figure 2:
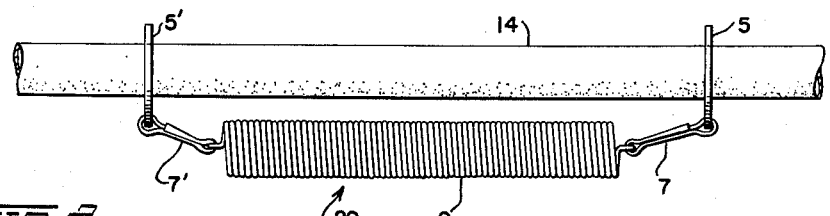
Fig. 2 is an enlarged view of a portion of flexible conduit or hose to which the present invention has been applied and showing the gripping members in released position.

As is evident in Fig. 2, the device may preferably be comprised of a pair of identical annular ring-like hose gripping elements 5, 5'. These elements resemble washers which have an internal diameter or inner periphery only slightly greater than the outside diameter or outer periphery of hose or conduit 14. Thus when these gripping elements 5, 5' are positioned as shown in Fig. 2, each may slide along the length of the flexible conduit or hose 14. However, when these gripping elements 5, 5' are cocked on the line 14 the internal annular edge thereof will engage and bite against the outer surface of hose or conduit 14 and the elements will not move along the hose. The gripping elements 5, 5' are interconnected further by an expansible helical spring 9, and a pair of snap couplings 7, 7'. The couplings 7, 7' connect each end of spring 9 to an outer peripheral portion of each of the gripping elements 5, 5' and may be released readily to enable disassembly of the device as may be desired.

Figure 3:
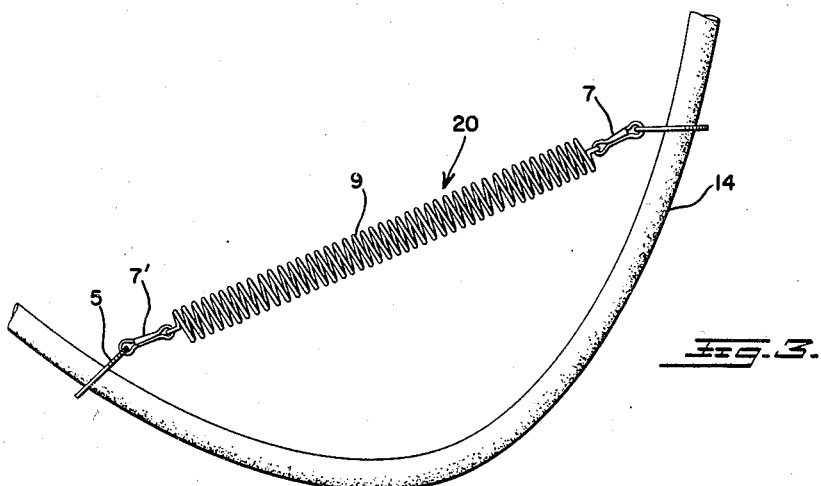
Fig. 3 is a view similar to Fig. 2, but showing the device locked to the conduit or hose as when tension is being applied thereto.

Considering now Figs. 2 and 3 together, it may be seen that so long as the spring 9 is contracted as shown in Fig. 2, the hose gripping members 5, 5' may slide freely along the length of the hose 14. Thus, the entire tensioning device 20 may be moved as a unit to any position along the hose 14. However, as may be seen in Fig. 3, when spring 9 is extended, it will cause the locking elements 5, 5' to cock or be angularly canted on the hose or conduit 14 and thus these elements lock against or grip the outer surface thereof.

Obviously if the ends of the conduit are fixed as shown in Fig. 1, this device 20 may be used to apply tension on line 14. This is done by manually locking either ring 5 or 5' on the hose surface, then by pulling the conduit through the opposite locking element to loop the hose between the gripping members as shown in both Figs. 1 and 3. Thus, the spring 9 causes both locking elements 5 and 5' to lock in a fixed relative position on the flexible conduit or hose 14 while at the same time it applies tension between the opposite ends of this latter member.

Thus, as in the case of a so called "hard milking" animal, the line 14 can be tensioned, which in turn through claw 10 applies increased pull on its udders through teat cups 16. By the amount of loop that is created in line 14 the degree of expansion of spring 9 may be varied and thus the pull on claw 10 may be varied to suit the need of each individual animal.

The present device may also be used to properly position or level the claw 10 beneath the animal to assure equal distribution of pull on each udder. Referring to Fig. 1 it may be seen that the device is positioned approximately half way between the fixed ends of conduit 14. Thus those portions of the conduit between tension device 20 and overhead pipe 2 and device 20 and claw 10 are substantially equal and tend to assume a right angular relation. Should it be desired to cause the claw 10 to be so positioned that the teat cups are subject to equal pull, it is only necessary to slide the device 20 in its entirety toward or away from the animal prior to looping of the hose between the gripping members 5, 5' to vary the position of the loop formed in the conduit 14 with respect to either overhead pipe 2 or animal A and the claw 10 will be leveled or canted as may be desired.

Thus, it may be seen that the present invention obviates many of the difficulties resulting from the use of combine milkers. In addition, the device is "self contained" that is does not require anchor points to walls or floors, and thus its use creates no obstructions which would be hazardous to either man or animal. In addition, the use of such hard to apply devices as cinch straps, etc., as has also been suggested as a solution to the mentioned problems, is completely obviated. The device may be readily removed from the conduits or applied thereto by simply disconnecting one end of the conduit from pipe 2 or claw 10 and sliding the locking elements 5, 5' along the hose 14 and either off of or onto the disconnected end. Further, the device is simple, long lasting and easy to use.

Having thus described the invention, it will be apparent that modifications and changes therein may be made, all of which are within the purpose of the invention, limited as it is only as defined in the following claims, wherein

What is claimed is:

1. In a milking device including a teat cup claw having a vacuum line and a milk line extending therefrom to vacuum and milk pipe installations, a tension means for one of said lines including a pair of spaced ring-like gripping elements slidably mounted on said line, said gripping elements having an inner periphery slightly greater than the outer periphery of said line and an elongated resilient means connected at its ends to an outer peripheral portion of each of said ring-like elements, whereby, when said ring-like elements are moved apart along said line to place tension on said resilient means, the tension on said teat cup claw may be varied.

2. A milking device as set forth in claim 1 wherein the said tension means is affixed to the milk line.

3. A milking device as set forth in claim 1 wherein said elongated resilient means comprises a helical spring.

References Cited in the file of this patent

UNITED STATES PATENTS

| | | |
|---|---|---|
| 483,545 | Cutten | Oct. 4, 1892 |
| 710,670 | Cutler et al. | Oct. 7, 1902 |
| 849,521 | Worcester | Apr. 9, 1907 |
| 2,793,616 | Warner | May 28, 1957 |

OTHER REFERENCES

Encyclopedia of Knots, Graumont, Figure 161, plate 257, page 474 and description page 473.